E. D. BEERS.
REPLANTING ATTACHMENT FOR CULTIVATORS.
APPLICATION FILED MAY 9, 1908.
910,774.
Patented Jan. 26, 1909.
2 SHEETS—SHEET 2.
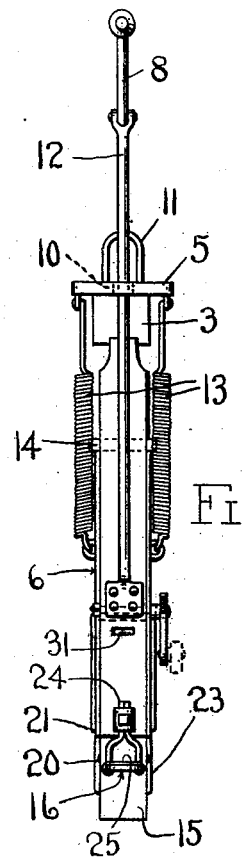
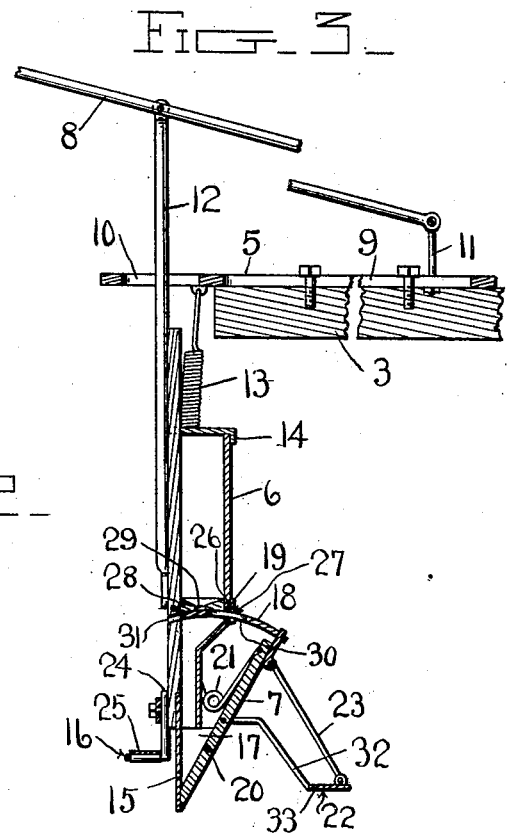
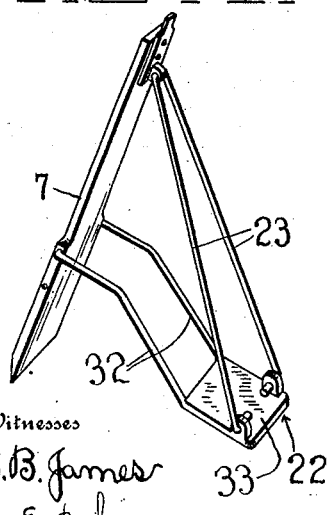
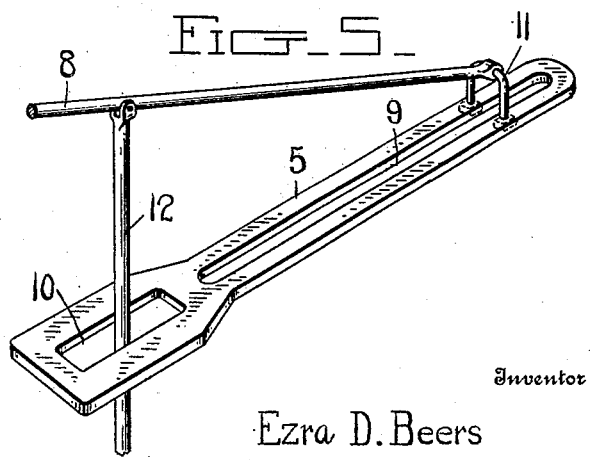
Inventor
Ezra D. Beers
Witnesses

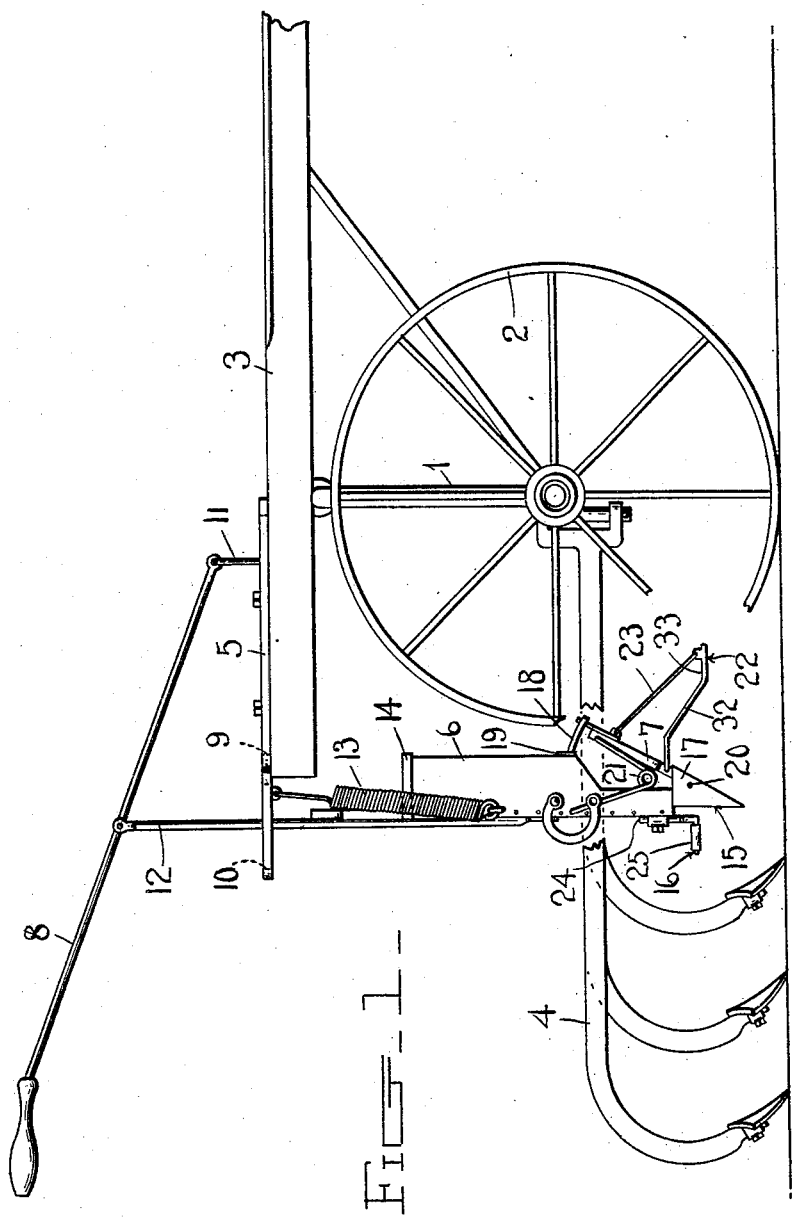

UNITED STATES PATENT OFFICE.

EZRA D. BEERS, OF IPAVA, ILLINOIS.

REPLANTING ATTACHMENT FOR CULTIVATORS.

No. 910,774.     Specification of Letters Patent.     Patented Jan. 26, 1909.

Application filed May 9, 1908. Serial No. 431,861.

*To all whom it may concern:*

Be it known that I, EZRA D. BEERS, a citizen of the United States, residing at Ipava, in the county of Fulton, State of Illinois, have invented certain new and useful Improvements in Replanting Attachments for Cultivators; and I do hereby declare the following to be a full, clear, and exact description of the invention, such as will enable others skilled in the art to which it appertains to make and use the same.

The present invention has reference to improvements in replanting attachments for cultivators, and it aims generally to provide an exceedingly simple and efficient replanting device which may be readily attached to the beam of a wheeled cultivator of any ordinary type, and which may be utilized for the purpose of depositing seeds in the hills that have been missed during the initial planting, as well as those where the planted seed for some reason have failed to sprout.

To this end, the invention, briefly described, comprises a hopper movable towards and from the ground, and provided at its lower end with a rocking jaw which is held normally in contact with said end when the hopper is in its raised position and which is withdrawn from such contact, when the hopper is lowered, to permit the seeds to be discharged from the hopper.

More especially, the invention resides in the particular devices employed for effecting the vertical movements of the hopper; in the specific construction of the jaw carried by the hopper; and in the particular construction and arrangement of the devices employed for supporting the jaw and for normally holding the same in contact with the hopper.

The preferred embodiment of the invention is illustrated in the accompanying drawings, in which corresponding parts or features, as the case may be, are designated by the same reference numerals throughout the several views.

Of the said drawings, Figure 1 is a side view of a cultivator provided with the improved replanting attachment. Fig. 2 is an enlarged rear elevation of the attachment. Fig. 3 is a section taken longitudinally therethrough. Fig. 4 is an enlarged perspective view of the rocking jaw. Fig. 5 is a perspective view of the supporting member of the attachment, and the operating lever pivoted thereto.

Referring more particularly to the drawings, 1 designates the cranked axle of the cultivator, 2 the ground wheels, 3 the beam or tongue, and 4 the ground-treating implements. These parts may be of any ordinary construction, and for this reason require no extended description.

The attachment which is located at the rear of the cultivator comprises primarily, a supporting member 5, a vertically-movable hopper 6, a rocking jaw 7 carried by the hopper, and an operating lever 8. The member 5 is in the form of an iron plate which is mounted upon the upper face of the beam, at the rear end thereof, and is provided with front and rear longitudinal slots 9 and 10, through the former of which extend the bolts by means of which the plate is fastened to the beam, the formation of said slot 9 permitting an adjustment of the plate longitudinally of the beam, as will be understood.

To the front end of the plate is secured an upstanding U-shaped bracket 11 to which the forward end of the operating lever 8 is pivoted, said lever being disposed longitudinally of the plate. Towards its outer or handle end, the lever has pivoted thereto the upper end of a vertical rod 12, which extends downwardly through the slot 10 in said plate, the rear end of which latter projects beyond that of the beam, as shown. The lower end of the rod 12 is bolted or otherwise rigidly secured to the rear wall of the hopper 6 which is connected with the supporting plate by means of a pair of retractile coil-springs 13, as a result of which the hopper is normally held in raised position, said springs being disposed at the sides of the hopper and being fastened thereto and to the plate.

The body portion of the hopper is rectangular in cross-section and its upper end is closed by a cover 14 which is removable from the hopper, to permit the latter to be filled with the seeds to be deposited. The lower portion of the hopper is reduced, to provide a discharge chute whose rear wall terminates in a fixed jaw 15, formed by a metal plate secured to the hopper. The outer face of the jaw has attached thereto an L-shaped stop 16 formed by a twisted strip of heavy wire 24, the horizontal arm of the stop carrying a metal plate 25. The lower portion of the opposite or front wall of the hopper terminates short of said rear wall.

The mouth of the discharge chute is normally closed by the angular rocking jaw 7 across the opposite side edges of whose widened lower end project a pair of forwardly-extending lateral flanges or wings 17 which are formed integral with the jaw 15, as shown. The reduced upper portion or stem of the jaw has secured to its upper end the outer end of a rearwardly-projecting arm or slide 18 movable through an opening 26 formed in the front wall of the hopper, which wall has bolted thereto a plate 19 provided with an opening 27 which registers with the first-mentioned opening.

Intermediate its ends, the jaw is hinged to the wings 17 of the fixed jaw, as indicated by the numeral 20, the arm or slide 18 to which the upper end of the stem of the jaw is connected being normally held in its projected position by means of a pair of expansible coil-springs 21, which are disposed adjacent the sides of the discharge chute and are connected to the latter and to said stem portion. Owing to the provision of these springs, the lower portion of the jaw is normally held against the mouth of the chute, closing the same and preventing the discharge of seed therethrough, as will be apparent. This arm or slide is arranged for movement directly beneath a plate 28 disposed within the body of the hopper and formed with a discharge orifice 29, which is closed by said arm or slide when the latter is in its normal or retracted position. An orifice 30 is likewise formed in the arm or slide, and when the latter is in its projected position, this last mentioned orifice will register with the orifice 29, thus permitting the seeds to fall therethrough into the space between the jaws 7 and 15. In this latter position, the free end of the arm or slide will project through an opening 31 formed in the rear wall of the hopper. The rocking jaw is likewise provided with a stop arm 22 which consists of a pair of forwardly and downwardly-extending parallel wires 32 secured at their rear ends to the side edges of the jaw and having their front ends connected together by a metal plate 33, the last mentioned end of said arm being braced by a pair of converging wires 23, whose upper ends are secured to the stem of the jaw, the lower ends of the brace wires being fastened to the plate.

In operation, the discharge portion of the hopper is filled with the seeds to be planted, it being understood that the attachment as a whole has been previously secured to the beam 3 in the manner above described, the coil-springs 13 retaining the hopper normally in raised position. When it is desired to effect a discharge of seed from the hopper, the lever 8 is swung downwardly towards the plate 5, depressing the rod 12 and lowering the hopper sufficiently to cause the free ends of the fixed and rocking jaws 15 and 7 to enter the ground, the depth to which the first mentioned jaw enters the ground being limited by the stop 16. When the stop 22 carried by the rocking jaw is brought into contact with the ground, it will rock said jaw upon its hinge or pivots, the upper portion or stem of the jaw being forced towards the hopper, the arm or slide 18 passing through the openings 27 and 26 in the plate 19 and the front wall of the hopper and having its free end projecting through the opening 31 in the rear wall thereof. The orifices 29 and 30 will thus be brought into registration with each other, and at the same time, the lower portion of the jaw will be moved out of contact with the mouth of the discharge chute, thus permitting the seed to pass through the mouth onto the ground. When the discharge has been effected, as above described, pressure is removed from the operating lever, whereupon the coil-springs 13 will raise the hopper into its normal position, while at the same time, the mouth of the discharge chute will be closed by the rocking jaw against whose stem portion the springs 21 bear.

Owing to the fact that the cultivator is in motion when the replanting attachment is actuated, the supporting rod 12 will have a sidewise movement relatively to the attachment proper, the formation of the slot 10 in the projecting rear end of said rod permitting such movement, as will be apparent. The formation of the front slot 9 permits an adjustment of said plate longitudinally of the beam, as previously stated.

The arm or slide 18 which is secured to the upper end of the rocking jaw and is slidable through the openings 27 and 26 in the plate 19 and the front wall of the hopper, serves as a guide for said jaw during its movement and also as a means for preventing sidewise movement and consequent displacement of said jaw. The inner end of this arm which is disposed within the interior of the hopper is preferably enlarged, to prevent its movement completely through said openings under the action of the springs 21.

What is claimed is:

1. The combination, with a slotted supporting member, of a lever pivoted at one end thereto; a vertical rod extending through the slot in said member and having its upper end pivoted to the lever; a hopper located beneath said member and secured to the lower end of said rod, said hopper being provided with a discharge mouth; means for normally holding the hopper in raised position; means for normally closing the mouth of the hopper; and means for automatically opening said mouth when the hopper is moved downwardly.

2. The combination, with a slotted supporting member, of a lever pivoted at one end thereto; an endwise movable vertical rod extending through the slot in said member and having its upper end pivoted to the lever; a hopper located beneath said member and secured to the lower end of said rod, said hopper being provided with a discharge mouth; means for normally holding the hopper in raised position; a rocking member pivoted to the hopper and having one end thereof adapted to normally close said mouth; and means for automatically rocking said member when the hopper is moved downwards, to uncover said mouth.

3. The combination, with a slotted supporting member, of a lever pivoted at one end thereto; an endwise movable vertical rod extending through the slot in said member and having its upper end pivoted to the lever; a hopper located beneath said member and secured to the lower end of said rod, said hopper being provided with a discharge mouth; a rocking member pivoted intermediate its ends to the hopper and having its lower end adapted to normally close said mouth; springs connected directly with said supporting member and with the hopper, for normally holding the latter in raised position; and means carried by said rocking member for rocking the same when brought into contact with the ground during the downward movement of the hopper, to uncover said mouth.

4. The combination, with a slotted supporting member, of a lever pivoted at one end thereto; an endwise movable vertical rod extending through the slot in said member and having its upper end pivoted to the lever; a hopper located beneath said member and secured to the lower end of said rod, said hopper being provided with an opening formed in its front wall, and with a discharge mouth located below the opening; a rocking member pivoted intermediate its ends to said hopper wall and provided at its upper end with an arm extending through said opening into the interior of the hopper; means interposed between said end and wall, for normally holding the lower end of said member in position to close said mouth; means for normally holding the hopper in raised position; and means carried by said rocking member for rocking the same when brought into contact with the ground during the downward movement of the hopper, to uncover said mouth.

5. The combination, with a slotted supporting member, of a lever pivoted at one end thereto; a vertical rod extending through the slot in said member and having its upper end pivoted to the lever; a hopper located beneath said member and secured to the lower end of said rod, said hopper being provided with an opening formed in its front wall, and with a discharge mouth located beneath said opening; springs connected directly to the supporting member and to the hopper, for normally holding the latter in raised position; a rocking member pivoted intermediate its ends to said hopper wall and provided at its upper end with an arm extending through said opening into the interior of the hopper; an expansible spring interposed between said wall and the upper end of said rocking member, for normally holding the lower end of the latter in position to close the mouth; and a forwardly-projecting arm carried by said last mentioned member, for rocking the same, to uncover said mouth.

In testimony whereof, I affix my signature, in presence of two witnesses.

EZRA D. BEERS.

Witnesses:
LEROY BEERS,
CHARLES S. BARROWS.